United States Patent
Saini et al.

(10) Patent No.: US 12,192,192 B2
(45) Date of Patent: Jan. 7, 2025

(54) SECURE ACCESS SERVICE EDGE FUNCTION WITH CONFIGURED METRIC COLLECTION INTELLIGENCE

(71) Applicant: Cisco Technology, Inc., San Jose, CA (US)

(72) Inventors: Vinay Saini, Bangalore (IN); Rajesh Indira Viswambharan, Bangalore (IN); Nagendra Kumar Nainar, Morrisville, NC (US); Akram Ismail Sheriff, San Jose, CA (US); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 17/749,274

(22) Filed: May 20, 2022

(65) Prior Publication Data

US 2023/0379319 A1 Nov. 23, 2023

(51) Int. Cl.
*H04L 9/40* (2022.01)

(52) U.S. Cl.
CPC ............ *H04L 63/083* (2013.01); *H04L 63/20* (2013.01)

(58) Field of Classification Search
CPC ... H04L 63/083; H04L 63/0876; H04L 63/08; H04L 63/20; H04L 63/205
See application file for complete search history.

(56) References Cited

U.S. PATENT DOCUMENTS

| | | | |
|---|---|---|---|
| 9,325,516 B2 | 4/2016 | Pera et al. | |
| 10,257,227 B1 * | 4/2019 | Stickle | G06F 21/577 |
| 10,447,815 B2 * | 10/2019 | Zandi | H04L 67/34 |
| 11,281,476 B2 * | 3/2022 | Thulasi | G06F 9/541 |
| 11,368,410 B2 * | 6/2022 | Parker | H04L 67/12 |
| 11,886,440 B1 * | 1/2024 | Breeden | G06F 16/906 |
| 11,888,863 B2 * | 1/2024 | Huston, III | H04L 63/1425 |
| 11,894,984 B2 * | 2/2024 | Erlingsson | H04L 63/1408 |
| 2021/0344738 A1 | 11/2021 | Petrie et al. | |
| 2022/0030334 A1 | 1/2022 | Stamatakis et al. | |

FOREIGN PATENT DOCUMENTS

| | | |
|---|---|---|
| KR | 20100090489 | 8/2010 |
| WO | 2022045851 A1 | 3/2022 |

* cited by examiner

*Primary Examiner* — Hosuk Song
(74) *Attorney, Agent, or Firm* — BEHMKE INNOVATION GROUP LLC; James M. Behmke; James J. Wong

(57) ABSTRACT

In one embodiment, a method herein comprises: receiving, at a device, a registration request from a telemetry exporter that transmits telemetry data; generating, by the device, a telemetry configuration file for the telemetry exporter, the telemetry configuration file defining a policy for transmission of telemetry data from the telemetry exporter and an authentication token for the telemetry exporter; sharing, by the device, the policy with a security enforcer; and sending, by the device, the telemetry configuration file to the telemetry exporter, wherein the telemetry exporter is caused to connect with the security enforcer using the authentication token, send the telemetry configuration file to the security enforcer, and transmit collected telemetry data to the security enforcer, and wherein the security enforcer is caused to create a dynamic publish-subscribe stream for publishing the collected telemetry data received from the telemetry exporter based on the telemetry configuration file and the policy.

20 Claims, 6 Drawing Sheets

SECURE ACCESS SERVICE EDGE FUNCTION WITH CONFIGURED METRIC COLLECTION INTELLIGENCE

TECHNICAL FIELD

The present disclosure relates generally to computer networks, and, more particularly, to a secure access service edge (SASE) function with configured metric collection (e.g., telemetry) intelligence.

BACKGROUND

"Industry 4.0" is a new phase in the Industrial Revolution that focuses heavily on interconnectivity, automation, machine learning, and real-time data. With Industry 4.0, faster digitization of the different industries is in focus. Internet of Things (IoT) endpoints are not only available in stationary machinery inside the manufacturing plants but also in moving vehicles like connected cars, fleet, and other devices in motion such as autonomous vehicles.

These IoT devices need to communicate at different intervals with various consumers (Trusted and Untrusted) for use-cases such as telemetry collection for predictive maintenance or a status collection like temperature/location of the vehicle and contents inside. With consumers of IoT data services in the cloud, it is critical to have a mechanism that allows insights about the device and its application and expected behavior to the cloud security providers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
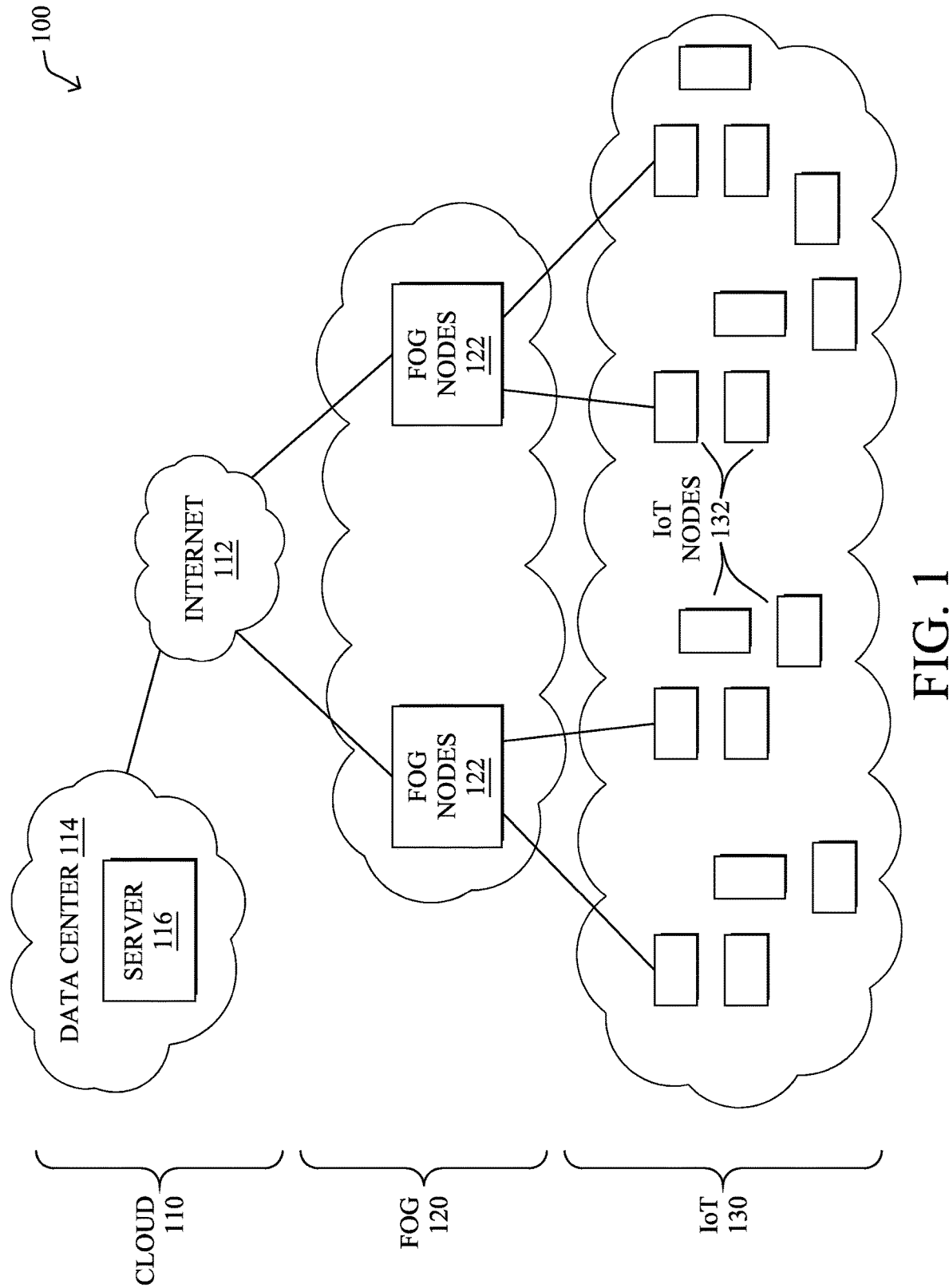
FIG. 1 illustrates an example communication network.

According to one or more embodiments of the disclosure, a secure access service edge (SASE) function with configured telemetry intelligence. In particular, IoT devices are not standard devices. They can also be in motion and have different connectivity needs. Data is often needed to be passed on to the different consumers based on type. location and criticality. The techniques herein solve this problem by proposing a new method based on SASE and a concept of parameter-based dynamic telemetry manufacturer usage description (MUD), which is updated dynamically, and data is processed based on a central function like IoT cloud access security broker (CASB) based on the specific inputs passed from the edge location.

Specifically, according to the embodiments herein, an illustrative method herein may comprise: receiving, at a device, a registration request from a telemetry exporter that transmits telemetry data; generating, by the device, a telemetry configuration file for the telemetry exporter, the telemetry configuration file defining a policy for transmission of telemetry data from the telemetry exporter and an authentication token for the telemetry exporter; sharing, by the device, the policy with a security enforcer; and sending, by the device, the telemetry configuration file to the telemetry exporter, wherein the telemetry exporter is caused to connect with the security enforcer using the authentication token, send the telemetry configuration file to the security enforcer, and transmit collected telemetry data to the security enforcer, and wherein the security enforcer is caused to create a dynamic publish-subscribe stream for publishing the collected telemetry data received from the telemetry exporter based on the telemetry configuration file and the policy.

In addition, according to the embodiments herein, an illustrative second method herein may comprise: receiving, at a device and from an operations controller, a policy for transmission of telemetry data from a telemetry exporter based on the telemetry exporter registering with the operations controller; connecting, by the device, with the telemetry exporter using an authentication token of the telemetry exporter provided to the telemetry exporter by the operations controller based on the telemetry exporter registering with the operations controller; receiving, at the device and from the telemetry exporter, a telemetry configuration file for the telemetry exporter, the telemetry configuration file containing the policy for transmission of telemetry data from the telemetry exporter; creating, by the device, a dynamic publish-subscribe stream for publishing collected telemetry data received from the telemetry exporter based on the telemetry configuration file and the policy; and publishing, from the device and on the dynamic publish-subscribe stream, collected telemetry data received from the telemetry exporter.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Networks may also be, or may include, an "Internet of Things" or "IoT" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

One type of IoT network is an Operational Technology (OT) network (e.g., an industrial control systems environment), where hardware and software are provided that detect or cause a change, through the direct monitoring and/or control of industrial equipment, assets, processes, and events.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, high bit error rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or hierarchy of layers from local networks (e.g., IoT networks) to the cloud (e.g., centralized and/or shared resources, as will be understood by those skilled in the art). That is, generally, fog computing entails using devices at the network edge to provide application services, including computation, networking, and storage, in close proximity to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple peer-to-peer and hierarchical layers of fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog layer 120, and IoT layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Figure 2:
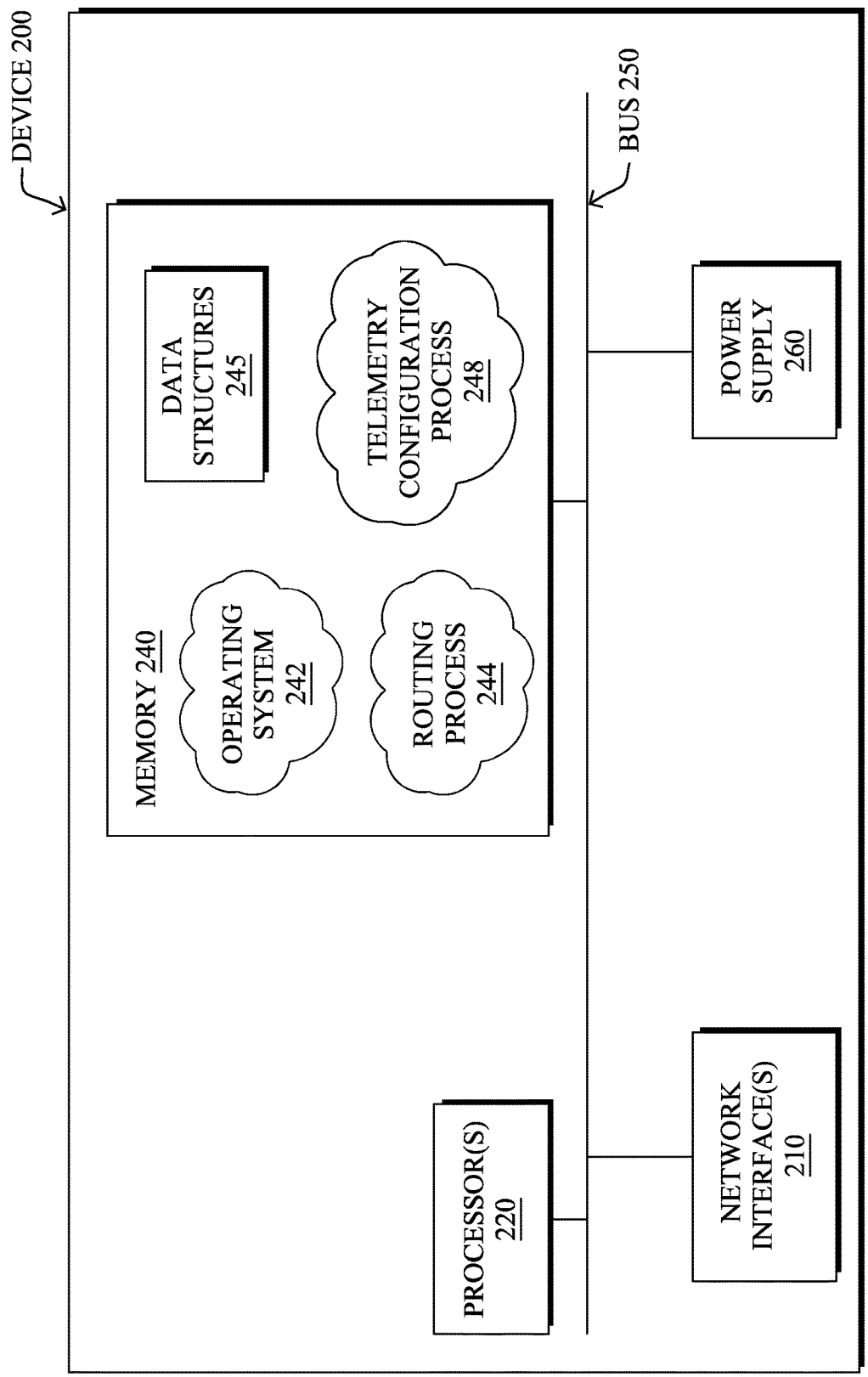
FIG. 2 illustrates an example network device/node.

FIG. 2 is a schematic block diagram of an example node/device 200 that may be used with one or more embodiments described herein, e.g., as any of the nodes/devices shown in FIG. 1 above (or FIG. 3, below). The device may comprise one or more network interfaces 210 (e.g., wired, wireless, power-line communication (PLC), etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections (interfaces 210), e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a routing process 244 and an illustrative "telemetry configuration" process 248, as described herein. Note that while process 248 is shown in centralized memory 240 alternative embodiments provide for the process to be specifically operated within the network interface(s) 210.

Routing services/process 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers (devices 200) using routing protocols, such as the conventional OSPF and IS-IS link-state protocols (e.g., to "converge" to an identical view of the network topology).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——SASE Function with Configured Telemetry Intelligence——

As noted above, "Industry 4.0" is a new phase in the Industrial Revolution that focuses heavily on interconnectivity, automation, machine learning, and real-time data. With Industry 4.0, faster digitization of the different industries is in focus. Internet of Things (IoT) endpoints are not only available in stationary machinery inside the manufacturing plants but also in moving vehicles like connected cars, fleet, and other devices in motion such as autonomous vehicles.

These IoT devices need to communicate at different intervals with various consumers (Trusted and Untrusted) for use-cases such as telemetry collection for predictive maintenance or a status collection like temperature/location of the vehicle and contents inside. With consumers of IoT data services in the cloud, it is critical to have a mechanism that allows insights about the device and its application and expected behavior to the cloud security providers.

In particular, current technologies do not offer a dedicated IoT security function in the cloud to process and apply a service chain to identify and process the traffic and send feedback to the enterprise owning the asset to take necessary action. It is equally important to process the traffic generated from IoT devices with all security acumen and to disperse the traffic to required consumers, while also sending back the intelligence to the enterprise to inform the enterprise of any infected or malicious devices getting involved in east-west communication within the enterprise security perimeter.

The techniques herein, therefore, provide a secure access service edge (SASE) function with configured telemetry intelligence. In particular, IoT devices are not standard devices. They can also be in motion and have different connectivity needs. Data is often needed to be passed on to the different consumers based on type location and criticality. The techniques herein solve this problem by proposing a new method based on SASE and a newly defined parameter based dynamic telemetry manufacturer usage description (MUD), which is updated dynamically, and data is processed based on a central function like IoT cloud access security broker (CASB), based on the specific inputs passed from the edge location.

Said differently, current technologies do not provide any SASE functions that inherently possess sophisticated toolchains to handle security requirements that an enterprise demands of IoT devices. As such, the techniques herein fill this gap by providing a MUD-based method to share the IoT device behavior with a newly defined IoT cloud SASE function for end-to-end visibility and action.

In general, with advancements in cloud computing, most of the IoT data is consumed by the applications running in the cloud. Traditional data is usually sent to a cloud function like SASE where different policies are applied and data is processed before it is sent/shared to its destination. However, there is no such function available in the cloud SASE today. Also, SASE has no mechanism to communicate with the enterprise IoT control functions to get insights about the device behavior to apply service chaining.

The techniques herein, on the other hand, propose a newly defined "IoT Secure Center service module" within SASE which allows Intelligent Data Distribution in a secure manner. This module consists of the following functions (but not limited to):

Protocol Broker like Message Queuing Telemetry Transport (MQTT) with Enterprise Validation Engine;
IoT CASB;

Pub-Sub based Information distribution pipeline;
On-Demand, telemetry request function;
Etc.

Figure 3:
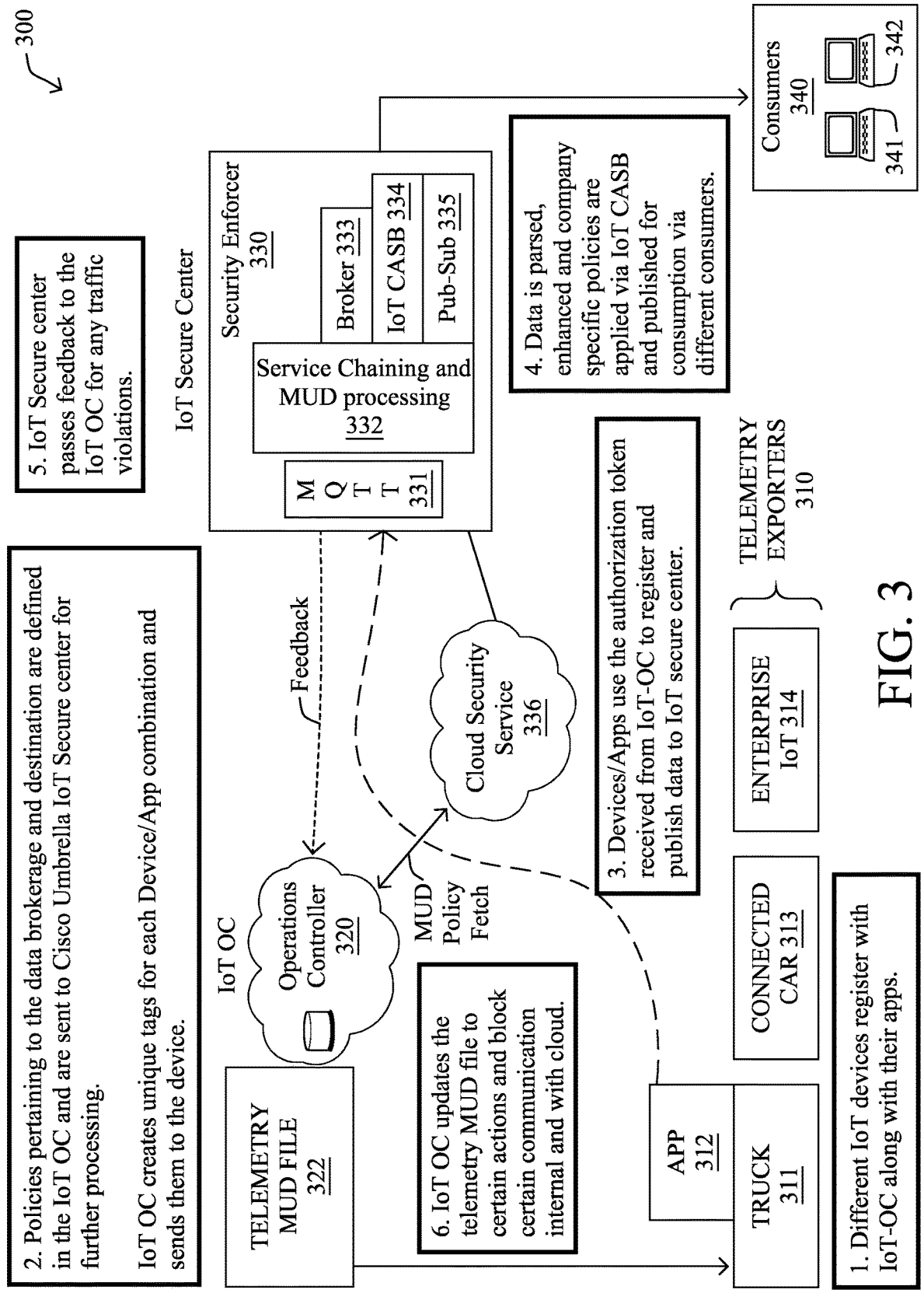
FIG. 3 illustrates an example infrastructure for secure access service edge (SASE) function with configured telemetry intelligence.

Operationally, and with reference to network environment 300 of FIG. 3, the techniques herein begin per standard procedures, where IoT devices (telemetry exporters 310) register themselves with the IoT operations center (IoT-OC), e.g., an operations controller 320. The IoT-OC also pulls the details about all the applications and modules running as containers on the various devices. For example, illustrative telemetry exporters may be such things as truck 311 (with an associated application 312), connected car 313, enterprise IoT devices 314, and so on.

The IoT-OC then creates a unique device and application tag for each device, with details of what kind of traffic telemetry streams are supported, their priority, message frequency, etc., for that particular telemetry exporter (e.g., in combination with a particular application on that exporter, accordingly). This may illustratively be created using a dynamic telemetry configuration file 322 (e.g., a "telemetry MUD" file or "T-MUD"). (Note that while the IoT-OC may be thought of as acting as an IoT MUD provider in this case, the techniques herein are an adaptation of traditional MUD behavior and are different, where the IoT-OC dynamically creates this Telemetry Configuration File based on this knowledge about a specific Device/App and the current environment and security needs, as opposed to an original manufacturer providing a MUD file for simple operational parameters.)

In one embodiment, multiple telemetry configuration files can be derived based on different attributes (such as location of the moving vehicle, access connectivity, current power, etc.) to push different types of telemetry data and to different types of consumer (e.g., microcloud vs. cloud consumer).

Based on the policy created on the IoT-OC, the IoT-OC pushes certain device data plane connections to the SASE IoT security center (security enforcer 330) to publish its content. The device uses the specific authorized Token/Credentials to create a connection with MQTT (or similar) server 331. In one specific embodiment, there is differential priority in specific MQTT Topics to publish the specific authorized Tokens/Credentials of devices/gateways to only specifically higher priority MQTT topics (or distributed event streaming platform topics, such as Kafka topics), so that the connection to be created with an MQTT broker 333 could be done quickly in a prioritized manner.

An IoT device shares its Telemetry configuration file with the SASE IoT Secure Center (IoT-SC), which it uses to pull the latest information from the IoT-OC (e.g., via cloud security services 336). The IoT-SC creates a dynamic pub-sub stream 335 based on the MUD file details received from the IoT-OC, and the IoT-SC applies the dynamic security service chain 332 (based on the configuration information) and invokes functions like IoT CASB 334. IoT CASB, in particular, is a specific function that understands the industrial and IoT specific protocols and security needs. This could be to check for any specific information leaks that could be done before publishing to external/internal entities (consumers 340, such as different types 341, 342, etc.), or anonymizing the data by removing the device media access control (MAC) address or other information, or removing personally identifying information (PII).

According to the techniques herein, any violation incidents may be passed to the IoT-OC, which then updates the telemetry configuration files to add new restrictions and share with policy servers like an identity services engine (ISE) to amend the access rules.

To reiterate, an example of the flow of techniques herein are illustrated in the example environment 300 of FIG. 3. As shown, steps may be as follows:

1. Different IoT devices register with IoT-OC along with their apps.
2. Policies pertaining to the data brokerage and destination are defined in the IoT-OC and are sent to IoT-SC for further processing—IoT OC creates unique tags for each device/app combination and sends them to device.
3. Devices/apps use the authorization token received from IoT-OC to register and publish data to IoT-SC.
4. Data is parsed, enhanced and company specific policies are applied via IoT CASB and published for consumption via different consumers.
5. IoT-SC passes feedback to the IoT-OC for any traffic violations.
6. IoT-OC updates the telemetry configuration file to certain actions and blocks certain communication internal and with cloud.

In another embodiment, additional attributes can be considered to derive multiple telemetry configuration files or simply multiple telemetry profiles as part of the same telemetry configuration file. The intention is to leverage additional attributes to define what data to collect and where to send for processing.

Figure 4:
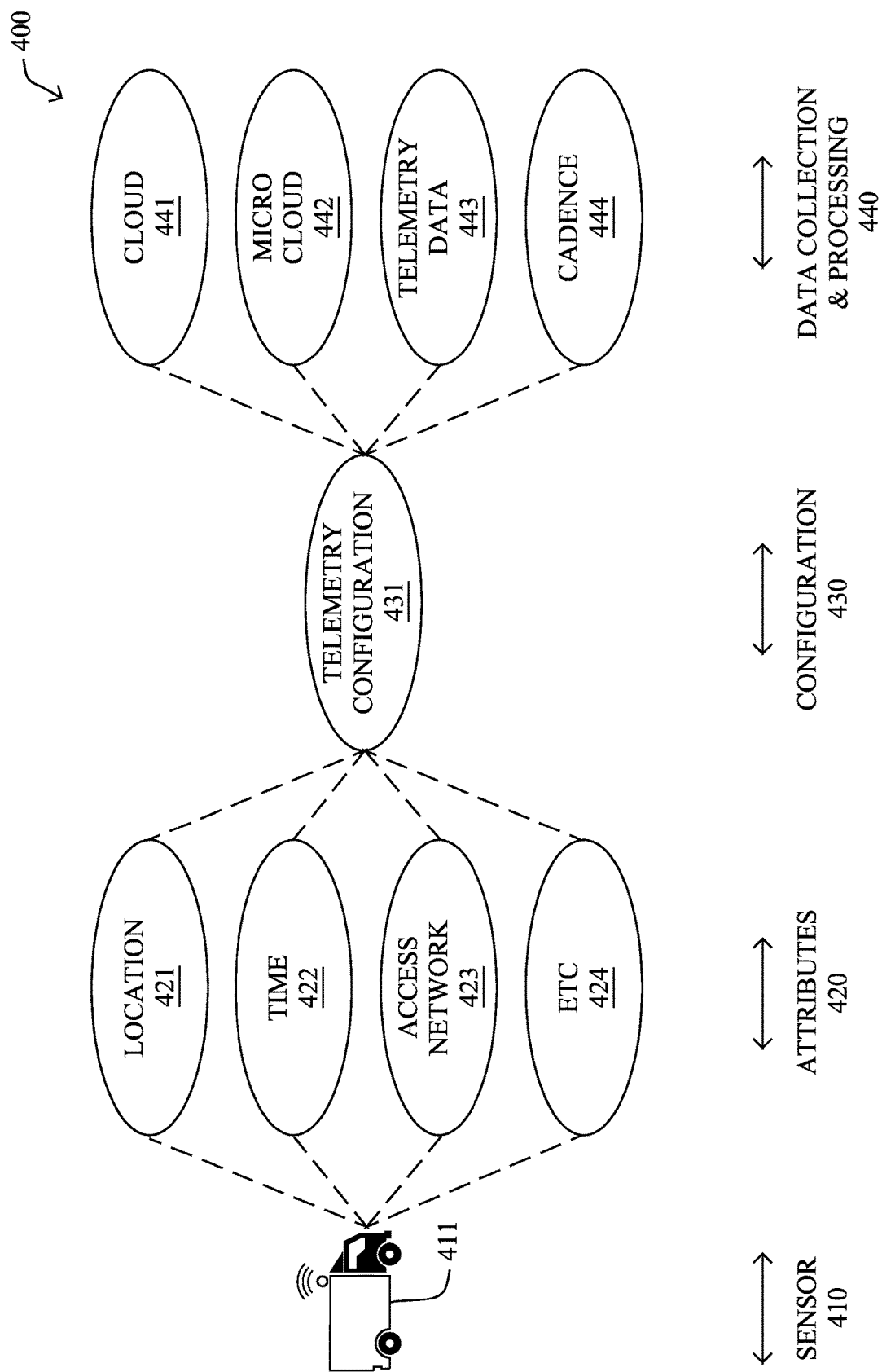
FIG. 4 illustrates an example telemetry environment which may implement the SASE function with configured telemetry intelligence herein.

As shown in diagram 400 of FIG. 4, the typical environment herein is based on one or more sensors 410 (e.g., truck 411), attributes 420, configuration 430 (e.g., telemetry configuration 431/T-MUD), and data collection and processing 440. As also shown, the location 421, time 422, access network 423, and other attributes 424 are some of the attributes 420 (but not limited to) that can be used to define the telemetry profile. This in turn is used to define collection and processing 440, such as depending on the type of consumer (e.g., cloud 441, microcloud 442), the type of telemetry data 443 to be collected, cadence 444, processing vantage point (who performs what processing, such as based on the end consumer 441/442), etc.

Based on the above, for example, when the truck/sensor is in location X connected, e.g., via wifi7 access network with the presence of edge/micro cloud, the voluminous amount of data may be shared for processing. On the other hand, for example, when the truck/sensor is location Y connected via a limited access network with no presence of edge/microcloud, the profile may be defined to share only critical data.

Alternately, this approach can be extended to offload the preprocessing responsibilities between the micro/edge cloud and the sensor itself. For example, the presence of microcloud can be used to simply pump the data to the micro cloud for preprocessing (including clearing the data for personally identifying information, "PII", etc.), while on the other hand, if the sensor is in a location where it is directly connected to the third party cloud, the preprocessing responsibilities (and so additional resource required) may be left with the sensor itself.

In closing, the techniques herein provide for dynamically creating the Telemetry based configuration files and sharing this context with cloud IoT SASE provider and either broker services. The techniques herein also provide methods and procedure to derive the Multiple Telemetry Profile from the telemetry configuration file based on the embedded attributes, as well as methods to offload telemetry processing based on the attributes and dynamic telemetry configuration. Furthermore, the techniques herein also provide a method and procedure to take feedback from a Cloud IoT SASE function to update the device access conditions in a configuration file and share it with the enterprise.

Figure 5:
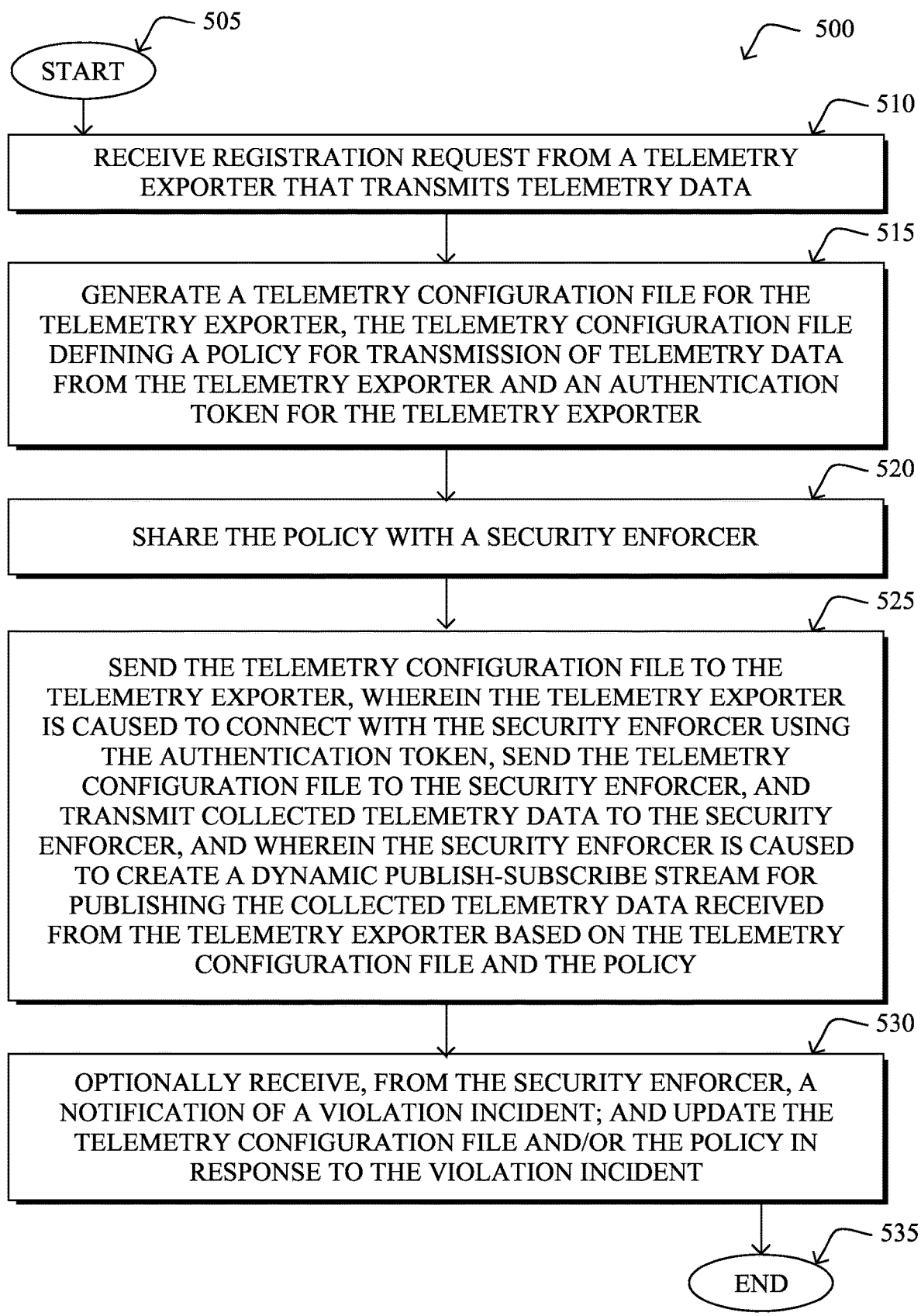
FIG. 5 illustrates an example simplified procedure for a SASE function with configured telemetry intelligence in accordance with one or more embodiments described herein, particularly from the perspective of an operations controller.

FIG. 5 illustrates an example simplified procedure 500 for a SASE function with configured telemetry intelligence in accordance with one or more embodiments described herein, particularly from the perspective of an operations controller 320 (e.g., an IoT OC). For example, a non-generic, specifically configured device (e.g., device 200) may perform procedure 500 by executing stored instructions (e.g., process 248). The procedure 500 may start at step 505, and continues to step 510, where, as described in greater detail above, the operations controller receives a registration request from a telemetry exporter that transmits telemetry data (e.g., an IoT device). In step 515, the operations controller may then generate a telemetry configuration file for the telemetry exporter, the telemetry configuration file defining a policy for transmission of telemetry data from the telemetry exporter and an authentication token for the telemetry exporter. Note that as described above, the registration request may relate to a specific application on the telemetry exporter that transmits telemetry data, and as such, generating the telemetry configuration file for the telemetry exporter may actually comprise generating the telemetry configuration file for a combination of the telemetry exporter and the specific application, wherein the telemetry configuration file defines the policy for transmission of telemetry data from the specific application and the authentication token for the combination of the telemetry exporter and the specific application.

In step 520, the operations controller shares the policy with a security enforcer. Note that the policy for transmission of telemetry data from the telemetry exporter may comprise rules pertaining to one or more of: types of telemetry streams supported, priority, message frequency (cadence), and processing vantage point, as described above.

In step 525, the operations controller sends the telemetry configuration file to the telemetry exporter, where the telemetry exporter is caused to connect with the security enforcer using the authentication token, send the telemetry configuration file to the security enforcer, and transmit collected telemetry data to the security enforcer, as described above, and also where the security enforcer is caused to create a dynamic publish-subscribe stream for publishing the collected telemetry data received from the telemetry exporter based on the telemetry configuration file and the policy, as also described above.

Optionally, in step 530, the operations controller may also receive, from the security enforcer, a notification of a violation incident; and updates the telemetry configuration file and/or the policy in response to the violation incident, accordingly.

The simplified procedure 500 may then end in step 535, notably with the option to continue receiving further registrations and further updates. Other steps may also be included generally within procedure 500. For example, such steps (or, more generally, such additions to steps already specifically illustrated above), may include any of the following specific embodiments and corresponding steps. For instance, in one embodiment, the registration request is associated with a set of attributes, and thus the telemetry configuration file and policy are also based on the set of associated attributes, for when the telemetry exporter corresponds to the set of associated attributes. (As mentioned above, attributes may be location, access connectivity, power level, time, a type of telemetry consumer, and so on). As such, the steps above may further include such things as: receiving a second registration request from the telemetry exporter, the second registration request having a second set of associated attributes; generating a second telemetry configuration file for the telemetry exporter, the second telemetry configuration file defining a second policy for transmission of telemetry data from the telemetry exporter when the telemetry exporter corresponds to the second set of associated attributes; sharing the second policy with a security enforcer; and sending the second telemetry configuration file to the telemetry exporter, wherein the telemetry exporter is caused to send the second telemetry configuration file to the security enforcer, and wherein the security enforcer is caused to create a second dynamic publish-subscribe stream for publishing the collected telemetry data received from the telemetry exporter based on the telemetry configuration file and the policy and when the telemetry exporter corresponds to the second set of associated attributes.

Figure 6:
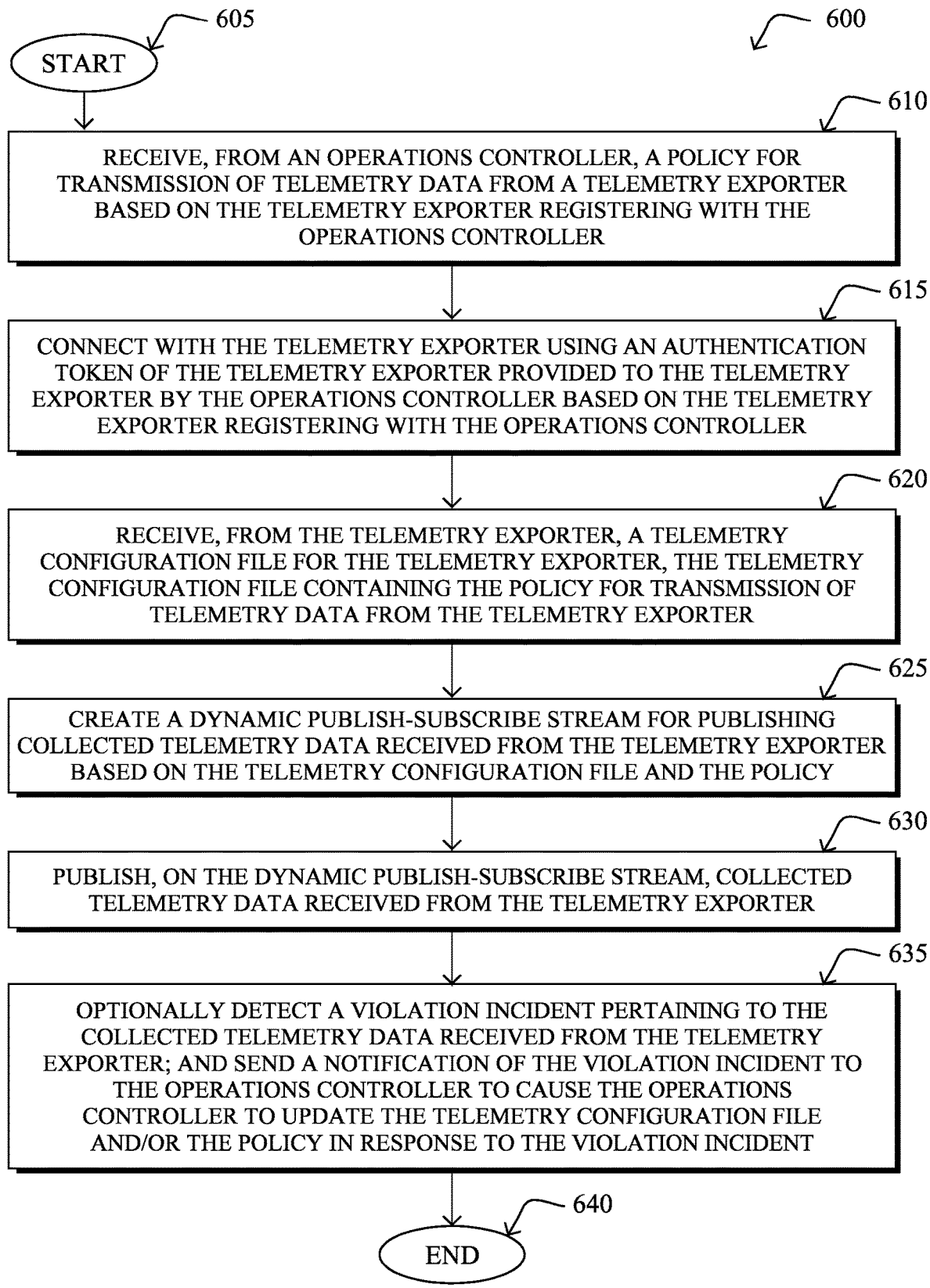
FIG. 6 illustrates another example simplified procedure for a SASE function with configured telemetry intelligence in accordance with one or more embodiments described herein, particularly from the perspective of a security enforcer.

In addition, FIG. 6 illustrates another example simplified procedure 600 for a SASE function with configured telemetry intelligence in accordance with one or more embodiments described herein, particularly from the perspective of a security enforcer 330 (e.g., an IoT-SC). For example, a non-generic, specifically configured device (e.g., device 200) may perform procedure 600 by executing stored instructions (e.g., process 248). The procedure 600 may start at step 605, and continues to step 610, where, as described in greater detail above, the security enforcer receives, from an operations controller, a policy for transmission of telemetry data from a telemetry exporter based on the telemetry exporter registering with the operations controller. (As noted above, in one embodiment, the telemetry exporter has registered with the operations controller indicating a specific application on the telemetry exporter that transmits telemetry data, and thus the telemetry configuration file is for a combination of the telemetry exporter and the specific application, such that the policy is for transmission of telemetry data from the specific application).

In step 615, the security enforcer connects with the telemetry exporter using an authentication token of the telemetry exporter provided to the telemetry exporter by the operations controller based on the telemetry exporter registering with the operations controller (e.g., where the authentication token is for the combination of the telemetry exporter and the specific application). Then, in step 620, the security enforcer receives, from the telemetry exporter, a telemetry configuration file for the telemetry exporter, the telemetry configuration file containing the policy for transmission of telemetry data from the telemetry exporter.

In step 625, the security enforcer creates a dynamic publish-subscribe stream for publishing collected telemetry data received from the telemetry exporter based on the telemetry configuration file and the policy. Then, in step 630, the security enforcer publishes, on the dynamic publish-subscribe stream, collected telemetry data received from the telemetry exporter. (Note also that in one embodiment, the security enforcer processes the collected telemetry data based on a cloud access security broker, as noted above.)

Optionally, in step 635, the security enforcer may detect a violation incident pertaining to the collected telemetry data received from the telemetry exporter; and sends a notification of the violation incident to the operations controller to cause the operations controller to update the telemetry configuration file and/or the policy in response to the violation incident, accordingly.

The simplified procedure 600 may then end in step 640, notably with the option to continue receiving further policies, connections, telemetry data, and so on. Other steps may also be included generally within procedure 600. For example, such steps (or, more generally, such additions to steps already specifically illustrated above), may include any of the following specific embodiments and corresponding steps. For instance, as noted above, in one embodiment, the registration request is associated with a set of attributes, and thus the telemetry configuration file and policy are also based on the set of associated attributes, for when the telemetry exporter corresponds to the set of associated attributes. As such, the steps above may further include such things as: receiving, from the operations controller, a second policy for transmission of telemetry data from the telemetry exporter when the telemetry exporter corresponds to a second set of associated attributes; receiving, from the telemetry exporter, a second telemetry configuration file for the telemetry exporter, the second telemetry configuration file containing a second policy for transmission of telemetry data from the telemetry exporter when the telemetry exporter corresponds to the second set of associated attributes; creating a second dynamic publish-subscribe stream for publishing collected telemetry data received from the telemetry exporter when the telemetry exporter corresponds to the second set of associated attributes based on the second telemetry configuration file and the second policy; and publishing collected telemetry data received from the telemetry exporter on the second dynamic publish-subscribe stream when the telemetry exporter corresponds to the second set of associated attributes.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for a secure access service edge (SASE) function with configured telemetry intelligence. In particular, though Cloud Security Functions are known, the techniques herein are specific to creating Telemetry MUD files and sharing them with the new SASE based IoT secure center function to process and consume the data from IoT devices in a secured manner.

Note that while the concept of using MUD in the SASE context to apply policies in the cloud is known, the techniques herein is not using the MUD flow and attaching to the SASE. Instead, the techniques herein propose a new concept of Telemetry MUD (T-MUD), which is not the same as merely MUD, but is an extension thereof (in one embodiment). The T-MUD file concept focuses on the telemetry part of the IoT devices and the file is dynamically updated and created by the central Policy Engine like IoT-OC based on the State/Type and another parameter of the device such as location, etc. Multiple context-aware T-MUD files can also be generated. Such behavior is not available in traditional MUD where the manufacturer decided the policy and content of MUD files are static for the duration of time.

The techniques herein further use the concept of attribute-based T-MUD which creates the telemetry profiles and allows the central function in SASE to further process and send the traffic based on the specific value of the attribute like Location, Time or combination of both. Moreover, the techniques herein have a feedback channel from SASE to IoT-OC to add/delete/Update the Parameters in T-MUD files based on any violation in a dynamic manner.

Illustratively, the techniques described herein may be performed by hardware, software, and/or firmware, such as in accordance with the illustrative telemetry configuration process 248, which may include computer executable instructions executed by the processor 220 to perform functions relating to the techniques described herein, e.g., in conjunction with corresponding processes of other devices in the computer network as described herein. In addition, the components herein may be implemented on a singular device or in a distributed manner, in which case the combination of executing devices can be viewed as their own singular "device" for purposes of executing the process 248.

According to the embodiments herein, an illustrative method herein may comprise: receiving, at a device, a registration request from a telemetry exporter that transmits telemetry data; generating, by the device, a telemetry configuration file for the telemetry exporter, the telemetry configuration file defining a policy for transmission of telemetry data from the telemetry exporter and an authentication token for the telemetry exporter; sharing, by the device, the policy with a security enforcer; and sending, by the device, the telemetry configuration file to the telemetry exporter, wherein the telemetry exporter is caused to connect with the security enforcer using the authentication token, send the telemetry configuration file to the security enforcer, and transmit collected telemetry data to the security enforcer, and wherein the security enforcer is caused to create a dynamic publish-subscribe stream for publishing the collected telemetry data received from the telemetry exporter based on the telemetry configuration file and the policy.

In one embodiment, the registration request relates to a specific application on the telemetry exporter that transmits telemetry data, and wherein generating the telemetry configuration file for the telemetry exporter comprises: generating the telemetry configuration file for a combination of the telemetry exporter and the specific application, wherein the telemetry configuration file defines the policy for transmission of telemetry data from the specific application and the authentication token for the combination of the telemetry exporter and the specific application.

In one embodiment, the registration request is a first registration request having a first set of associated attributes, and the telemetry configuration file is a first telemetry configuration file for the telemetry exporter based on the first set of associated attributes, the first telemetry configuration file defining a first policy for transmission of telemetry data from the telemetry exporter when the telemetry exporter corresponds to the first set of associated attributes, and wherein the dynamic publish-subscribe stream is a first dynamic publish-subscribe stream for publishing the collected telemetry data received from the telemetry exporter when the telemetry exporter corresponds to the first set of associated attributes. In one embodiment, the method further comprises: receiving a second registration request from the telemetry exporter, the second registration request having a second set of associated attributes; generating a second telemetry configuration file for the telemetry exporter, the second telemetry configuration file defining a second policy for transmission of telemetry data from the telemetry exporter when the telemetry exporter corresponds to the second set of associated attributes; sharing the second policy with a security enforcer; and sending the second telemetry configuration file to the telemetry exporter, wherein the telemetry exporter is caused to send the second telemetry configuration file to the security enforcer, and wherein the security enforcer is caused to create a second dynamic publish-subscribe stream for publishing the collected telemetry data received from the telemetry exporter based on the telemetry configuration file and the policy and when the telemetry exporter corresponds to the second set of associated attributes. In one embodiment, the first set of associated attributes are selected from a group consisting of: location; access connectivity; power level; and time. In one embodiment, the first set of associated attributes are based on a type of telemetry consumer.

In one embodiment, the policy for transmission of telemetry data from the telemetry exporter comprises rules pertaining to one or more of: types of telemetry streams supported; priority; message frequency; and processing vantage point.

In one embodiment, the method further comprises: receiving, from the security enforcer, a notification of a violation incident; and updating the telemetry configuration file and/or the policy in response to the violation incident.

According to the embodiments herein, an illustrative tangible, non-transitory, computer-readable medium herein may have computer-executable instructions stored thereon that, when executed by a processor on a computer, may cause the computer to perform a method comprising: receiving a registration request from a telemetry exporter that transmits telemetry data; generating a telemetry configuration file for the telemetry exporter, the telemetry configuration file defining a policy for transmission of telemetry data from the telemetry exporter and an authentication token for the telemetry exporter; sharing the policy with a security enforcer; and sending the telemetry configuration file to the telemetry exporter, wherein the telemetry exporter is caused to connect with the security enforcer using the authentication token, send the telemetry configuration file to the security enforcer, and transmit collected telemetry data to the security enforcer, and wherein the security enforcer is caused to create a dynamic publish-subscribe stream for publishing the collected telemetry data received from the telemetry exporter based on the telemetry configuration file and the policy.

Further, according to the embodiments herein an illustrative apparatus herein may comprise: a processor configured to execute one or more processes; and a memory configured to store a process that is executable by the processor, the process, when executed, configured to: receive a registration request from a telemetry exporter that transmits telemetry data; generate a telemetry configuration file for the telemetry exporter, the telemetry configuration file defining a policy for transmission of telemetry data from the telemetry exporter and an authentication token for the telemetry exporter; share the policy with a security enforcer; and send the telemetry configuration file to the telemetry exporter, wherein the telemetry exporter is caused to connect with the security enforcer using the authentication token, send the telemetry configuration file to the security enforcer, and transmit collected telemetry data to the security enforcer, and wherein the security enforcer is caused to create a dynamic publish-subscribe stream for publishing the collected telemetry data received from the telemetry exporter based on the telemetry configuration file and the policy.

According to the embodiments herein, an illustrative second method herein may comprise: receiving, at a device and from an operations controller, a policy for transmission of telemetry data from a telemetry exporter based on the telemetry exporter registering with the operations controller; connecting, by the device, with the telemetry exporter using an authentication token of the telemetry exporter provided to the telemetry exporter by the operations controller based on the telemetry exporter registering with the operations controller; receiving, at the device and from the telemetry exporter, a telemetry configuration file for the telemetry exporter, the telemetry configuration file containing the policy for transmission of telemetry data from the telemetry exporter; creating, by the device, a dynamic publish-subscribe stream for publishing collected telemetry data received from the telemetry exporter based on the telemetry configuration file and the policy; and publishing, from the device and on the dynamic publish-subscribe stream, collected telemetry data received from the telemetry exporter.

In one embodiment, the telemetry exporter has registered with the operations controller indicating a specific application on the telemetry exporter that transmits telemetry data, and wherein the telemetry configuration file is for a combination of the telemetry exporter and the specific application, wherein the policy is for transmission of telemetry data from the specific application, and wherein the authentication token is for the combination of the telemetry exporter and the specific application.

In one embodiment, the telemetry configuration file is a first telemetry configuration file for the telemetry exporter based on a first set of associated attributes, the policy is a first policy for transmission of telemetry data from the telemetry exporter when the telemetry exporter corresponds to the first set of associated attributes, and wherein the dynamic publish-subscribe stream is a first dynamic publish-subscribe stream for publishing the collected telemetry data received from the telemetry exporter when the telemetry exporter corresponds to the first set of associated attributes. In one embodiment, the second method further comprises: receiving, from the operations controller, a second policy for transmission of telemetry data from the telemetry exporter when the telemetry exporter corresponds to a second set of associated attributes; receiving, from the telemetry exporter, a second telemetry configuration file for the telemetry exporter, the second telemetry configuration file containing a second policy for transmission of telemetry data from the telemetry exporter when the telemetry exporter corresponds to the second set of associated attributes; creating a second dynamic publish-subscribe stream for publishing collected telemetry data received from the telemetry exporter when the telemetry exporter corresponds to the second set of associated attributes based on the second telemetry configuration file and the second policy; and publishing collected telemetry data received from the telemetry exporter on the second dynamic publish-subscribe stream when the telemetry exporter corresponds to the second set of associated attributes. In one embodiment, the first set of associated attributes are selected from a group consisting of: location; access connectivity; power level; and time. In one embodiment, the first set of associated attributes are based on a type of telemetry consumer.

In one embodiment, the second method further comprises: processing the collected telemetry data based on a cloud access security broker.

In one embodiment, the second method further comprises: detecting a violation incident pertaining to the collected telemetry data received from the telemetry exporter; and sending a notification of the violation incident to the operations controller to cause the operations controller to update the telemetry configuration file and/or the policy in response to the violation incident.

According to the embodiments herein, an illustrative tangible, non-transitory, computer-readable medium herein may have computer-executable instructions stored thereon that, when executed by a processor on a computer, may cause the computer to perform a method comprising: receiving, from an operations controller, a policy for transmission of telemetry data from a telemetry exporter based on the telemetry exporter registering with the operations controller; connecting with the telemetry exporter using an authentication token of the telemetry exporter provided to the telemetry exporter by the operations controller based on the telemetry exporter registering with the operations controller; receiving from the telemetry exporter, a telemetry configuration file for the telemetry exporter, the telemetry configuration file containing the policy for transmission of telemetry data from the telemetry exporter; creating a dynamic publish-subscribe stream for publishing collected telemetry data received from the telemetry exporter based on the telemetry configuration file and the policy; and publishing, on the dynamic publish-subscribe stream, collected telemetry data received from the telemetry exporter.

Further, according to the embodiments herein an illustrative apparatus herein may comprise: a processor configured to execute one or more processes; and a memory configured to store a process that is executable by the processor, the process, when executed, configured to: receive, from an operations controller, a policy for transmission of telemetry data from a telemetry exporter based on the telemetry exporter registering with the operations controller; connect with the telemetry exporter using an authentication token of the telemetry exporter provided to the telemetry exporter by the operations controller based on the telemetry exporter registering with the operations controller; receive from the telemetry exporter, a telemetry configuration file for the telemetry exporter, the telemetry configuration file containing the policy for transmission of telemetry data from the telemetry exporter; create a dynamic publish-subscribe stream for publishing collected telemetry data received from the telemetry exporter based on the telemetry configuration file and the policy; and publish, on the dynamic publish-subscribe stream, collected telemetry data received from the telemetry exporter.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a provider", those skilled in the art will appreciate that other modules, components, and/or agents may be considered to be extensions of the gateway/controller/manager operation, and as such, any process step performed "by a device" need not be limited to local processing on a specific device, unless otherwise specifically noted as such.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, at a device, a registration request from a telemetry exporter that transmits telemetry data;
generating, by the device, a telemetry configuration file for the telemetry exporter, the telemetry configuration file defining a policy for transmission of telemetry data from the telemetry exporter and an authentication token for the telemetry exporter;
sharing, by the device, the policy with a security enforcer; and
sending, by the device, the telemetry configuration file to the telemetry exporter, wherein the telemetry exporter is caused to: connect with the security enforcer using the authentication token, send the telemetry configuration file to the security enforcer, and transmit collected telemetry data to the security enforcer, and further wherein the security enforcer is caused to create, based on obtaining the telemetry configuration file and the policy, a dynamic publish-subscribe stream for publishing the collected telemetry data received from the telemetry exporter.

2. The method as in claim 1, wherein the registration request relates to a specific application on the telemetry exporter that transmits telemetry data, and wherein generating the telemetry configuration file for the telemetry exporter comprises:
- generating the telemetry configuration file for a combination of the telemetry exporter and the specific application, wherein the telemetry configuration file defines the policy for transmission of telemetry data from the specific application and the authentication token for the combination of the telemetry exporter and the specific application.

3. The method as in claim 1, wherein the registration request is a first registration request having a first set of associated attributes, and the telemetry configuration file is a first telemetry configuration file for the telemetry exporter based on the first set of associated attributes, the first telemetry configuration file defining a first policy for transmission of telemetry data from the telemetry exporter when the telemetry exporter corresponds to the first set of associated attributes, and wherein the dynamic publish-subscribe stream is a first dynamic publish-subscribe stream for publishing the collected telemetry data received from the telemetry exporter when the telemetry exporter corresponds to the first set of associated attributes.

4. The method as in claim 3, further comprising:
- receiving a second registration request from the telemetry exporter, the second registration request having a second set of associated attributes;
- generating a second telemetry configuration file for the telemetry exporter, the second telemetry configuration file defining a second policy for transmission of telemetry data from the telemetry exporter when the telemetry exporter corresponds to the second set of associated attributes;
- sharing the second policy with a security enforcer; and
- sending the second telemetry configuration file to the telemetry exporter, wherein the telemetry exporter is caused to send the second telemetry configuration file to the security enforcer, and wherein the security enforcer is caused to create a second dynamic publish-subscribe stream for publishing the collected telemetry data received from the telemetry exporter based on the telemetry configuration file and the policy and when the telemetry exporter corresponds to the second set of associated attributes.

5. The method as in claim 3, wherein the first set of associated attributes are selected from a group consisting of: location; access connectivity; power level; and time.

6. The method as in claim 3, wherein the first set of associated attributes are based on a type of telemetry consumer.

7. The method as in claim 1, wherein the policy for transmission of telemetry data from the telemetry exporter comprises rules pertaining to one or more of: types of telemetry streams supported; priority; message frequency; and processing vantage point.

8. The method as in claim 1, further comprising:
- receiving, from the security enforcer, a notification of a violation incident; and
- updating the telemetry configuration file and/or the policy in response to the violation incident.

9. A tangible, non-transitory, computer-readable medium having computer-executable instructions stored thereon that, when executed by a processor on a computer, cause the computer to perform a method comprising:
- receiving a registration request from a telemetry exporter that transmits telemetry data;
- generating a telemetry configuration file for the telemetry exporter, the telemetry configuration file defining a policy for transmission of telemetry data from the telemetry exporter and an authentication token for the telemetry exporter;
- sharing the policy with a security enforcer; and
- sending the telemetry configuration file to the telemetry exporter, wherein the telemetry exporter is caused to connect with the security enforcer using the authentication token, send the telemetry configuration file to the security enforcer, and transmit collected telemetry data to the security enforcer, and further wherein the security enforcer is caused to create, based on obtaining the telemetry configuration file and the policy, a dynamic publish-subscribe stream for publishing the collected telemetry data received from the telemetry exporter.

10. The tangible, non-transitory, computer-readable medium as in claim 9, wherein the registration request relates to a specific application on the telemetry exporter that transmits telemetry data, and wherein generating the telemetry configuration file for the telemetry exporter comprises:
- generating the telemetry configuration file for a combination of the telemetry exporter and the specific application, wherein the telemetry configuration file defines the policy for transmission of telemetry data from the specific application and the authentication token for the combination of the telemetry exporter and the specific application.

11. The tangible, non-transitory, computer-readable medium as in claim 9, wherein the registration request is a first registration request having a first set of associated attributes, and the telemetry configuration file is a first telemetry configuration file for the telemetry exporter based on the first set of associated attributes, the first telemetry configuration file defining a first policy for transmission of telemetry data from the telemetry exporter when the telemetry exporter corresponds to the first set of associated attributes, and wherein the dynamic publish-subscribe stream is a first dynamic publish-subscribe stream for publishing the collected telemetry data received from the telemetry exporter when the telemetry exporter corresponds to the first set of associated attributes, wherein the method further comprises:
- receiving a second registration request from the telemetry exporter, the second registration request having a second set of associated attributes;
- generating a second telemetry configuration file for the telemetry exporter, the second telemetry configuration file defining a second policy for transmission of telemetry data from the telemetry exporter when the telemetry exporter corresponds to the second set of associated attributes;
- sharing the second policy with a security enforcer; and
- sending the second telemetry configuration file to the telemetry exporter, wherein the telemetry exporter is caused to send the second telemetry configuration file to the security enforcer, and wherein the security enforcer is caused to create a second dynamic publish-subscribe stream for publishing the collected telemetry data received from the telemetry exporter based on the telemetry configuration file and the policy and when the telemetry exporter corresponds to the second set of associated attributes.

12. A method, comprising:
- receiving, at a device and from an operations controller, a policy for transmission of telemetry data from a telemetry exporter based on the telemetry exporter registering with the operations controller;

connecting, by the device, with the telemetry exporter using an authentication token of the telemetry exporter provided to the telemetry exporter by the operations controller based on the telemetry exporter registering with the operations controller;

receiving, at the device and from the telemetry exporter, a telemetry configuration file for the telemetry exporter, the telemetry configuration file containing the policy for transmission of telemetry data from the telemetry exporter;

creating, by the device and based on receiving the telemetry configuration file and the policy, a dynamic publish-subscribe stream for publishing collected telemetry data received from the telemetry exporter; and publishing, from the device and on the dynamic publish-subscribe stream, collected telemetry data received from the telemetry exporter.

13. The method as in claim 12, wherein the telemetry exporter has registered with the operations controller indicating a specific application on the telemetry exporter that transmits telemetry data, and wherein the telemetry configuration file is for a combination of the telemetry exporter and the specific application, wherein the policy is for transmission of telemetry data from the specific application, and wherein the authentication token is for the combination of the telemetry exporter and the specific application.

14. The method as in claim 12, wherein the telemetry configuration file is a first telemetry configuration file for the telemetry exporter based on a first set of associated attributes, the policy is a first policy for transmission of telemetry data from the telemetry exporter when the telemetry exporter corresponds to the first set of associated attributes, and wherein the dynamic publish-subscribe stream is a first dynamic publish-subscribe stream for publishing the collected telemetry data received from the telemetry exporter when the telemetry exporter corresponds to the first set of associated attributes.

15. The method as in claim 14, further comprising:
receiving, from the operations controller, a second policy for transmission of telemetry data from the telemetry exporter when the telemetry exporter corresponds to a second set of associated attributes;

receiving, from the telemetry exporter, a second telemetry configuration file for the telemetry exporter, the second telemetry configuration file containing a second policy for transmission of telemetry data from the telemetry exporter when the telemetry exporter corresponds to the second set of associated attributes;

creating a second dynamic publish-subscribe stream for publishing collected telemetry data received from the telemetry exporter when the telemetry exporter corresponds to the second set of associated attributes based on the second telemetry configuration file and the second policy; and publishing collected telemetry data received from the telemetry exporter on the second dynamic publish-subscribe stream when the telemetry exporter corresponds to the second set of associated attributes.

16. The method as in claim 14, wherein the first set of associated attributes are selected from a group consisting of: location; access connectivity; power level; and time.

17. The method as in claim 14, wherein the first set of associated attributes are based on a type of telemetry consumer.

18. The method as in claim 12, further comprising:
processing the collected telemetry data based on a cloud access security broker.

19. The method as in claim 12, wherein the policy for transmission of telemetry data from the telemetry exporter comprises rules pertaining to one or more of: types of telemetry streams supported; priority; message frequency; and processing vantage point.

20. The method as in claim 12, further comprising:
detecting a violation incident pertaining to the collected telemetry data received from the telemetry exporter; and
sending a notification of the violation incident to the operations controller to cause the operations controller to update the telemetry configuration file and/or the policy in response to the violation incident.

\* \* \* \* \*